Aug. 10, 1948.   M. J. MAYNARD   2,446,658
PROPELLER PITCH CHANGING ARRANGEMENT
Filed Dec. 9, 1943
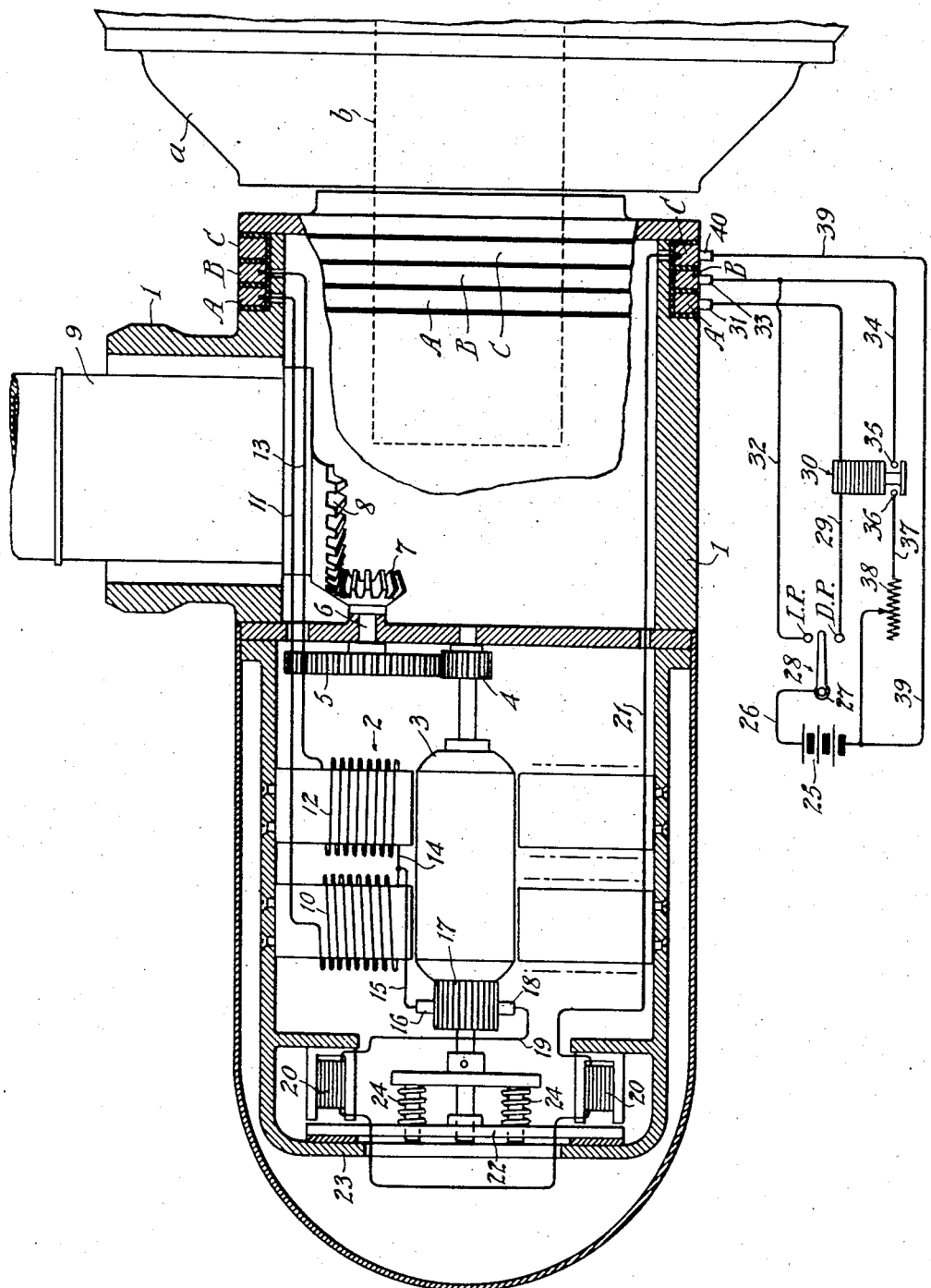
INVENTOR
Meade J. Maynard
BY
ATTORNEY Patented Aug. 10, 1948

2,446,658

UNITED STATES PATENT OFFICE 2,446,658

PROPELLER PITCH CHANGING ARRANGEMENT

Meade J. Maynard, West Caldwell, N. J., assignor to Curtiss-Wright Corporation, a corporation of Delaware Application December 9, 1943, Serial No. 513,600

6 Claims. (Cl. 170—163)

My invention relates to a pitch changing system for airplane propellers.

More specifically, my invention relates to a suitable braking arrangement for preventing overspeeding of an airplane pitch-changing motor when operating in decreased pitch direction, and means for suspending the operation of this braking arrangement during operation of the motor in increased pitch direction.

In a preferred form of my invention, I utilize a motor comprising field coils adapted to establish magnetic fields of uniform flux density and opposite polarity, respectively, when energized by currents of equal magnitude. During operation of the motor in decreased pitch direction, one field coil is energized in conventional fashion. The flux density of the magnetic field established by this field coil is supplemented by causing additional electric current to flow therethrough and simultaneously energizing and reversing the polarity of a reversely wound field coil, this increase in the flux density of the magnetic field causing a proportionate reduction in what would otherwise be the speed of the motor during its operation in a direction to decrease the pitch of the controlled blades. In accordance with the invention, this reversely wound field coil is also utilizable for operation of the motor in increased pitch direction.

For an understanding of my invention and for an illustration of one of the many forms thereof, reference is to be had to the accompanying drawing, in which the figure is a diagrammatic representation of a pitch changing arrangement constructed in accordance with my invention.

Referring to the drawing, I have shown the nose $a$ of a suitable aircraft engine which rotates a propeller shaft $b$ having secured thereto the hub 1 of an electric propeller said hub 1 carrying the slip rings A, B and C. Associated with the hub 1 and rotatable as a unit therewith is the motor 2 which is adapted to change the propeller blade pitch. To this end, the motor armature 3 carries a gear wheel 4 which drives a gear wheel 5 carried by a suitably journalled shaft 6 to which is secured a gear wheel 7 meshing with a gear wheel 8 on the end of a propeller blade 9. It will be recognized by those skilled in the art that the arrangement described above is little more than a diagrammatic representation of any well known arrangement for changing the pitch of a multi-blade propeller.

Forming a part of the motor 2 is a series wound field coil 10, the upper terminal of which is connected to the slip ring A by conductor 11. Also forming a part of the motor 2 is a series wound field coil 12 which is oppositely wound with respect to said field coil 10. The upper terminal of the field coil 12 is connected to the slip ring B by conductor 13. The lower terminal of the field coil 12 is connected to the lower terminal of the field coil 10 by conductor 14. Branching from the conductor 14 is a conductor 15 which extends to a brush 16, coactable with the commutator 17 of the motor 2.

Diametrically opposite the brush 16 and coactable with the commutator 17 is a brush 18 which is connected by conductor 19 to one terminal of the twin electromagnets 20, the other terminal of the twin electromagnets 20 being connected to the slip ring C by conductor 21.

When energized, the electromagnets 20 are adapted to release the brake disk 22 of the armature 3 from its normal position in engagement with a hub section 23, in which engaged position it is normally held by action of compression springs 24.

Disposed outside the hub 1 is a battery 25, or other suitable source of electrical energy. The conductor 26 extends from the positive terminal of said battery 25 to a fixed contact member 27 on the arm of a switch 28. The arm of the switch 28 may remain in neutral position, as shown, or it may contact individually the fixed contact members IP and DP.

Extending from the fixed contact member DP is a conductor 29 which includes the winding of a relay 30 and extends to a brush 31 contactable with the slip ring A. Extending from the fixed contact member IP is the conductor 32 which extends to a brush 33, contactable with the slip ring B. Branching from said conductor 32 is conductor 34 which extends to a fixed contact member 35 coactable with the armature of the relay 30. Also coactable with the armature of the relay 30 is a fixed contact member 36 to which is attached a conductor 37. The conductor 37 includes a variable resistor 38 and passes to the negative terminal of the battery 25. Branching from said conductor 37 is conductor 39 which extends to a brush 40 coactable with the slip ring C.

In response to movement of the switch 28 to increased pitch position, the arm of the switch 28 engages the fixed contact member IP closing a circuit which includes the arm of the switch 28, fixed contact member IP, conductor 32, brush 33, slip ring B, conductor 13, field coil 12, conductor 14, conductor 15, brush 16, commutator 17 and related armature windings, not shown, brush 18, conductor 19, twin electromagnets 20, conductor 21, slip ring C, brush 40, conductor 39, conductor 37, negative terminal of the battery 25, positive terminal of the battery 25, conductor 26 and the fixed contact member 27 on the arm of the switch 28.

In response to the closure of the above described circuit, the field coil 12 is energized and a magnetic field of suitable flux density and polarity is established with respect to the armature windings of the motor 2. Also responsive to the closure of this circuit, the electromagnets 20 are energized, causing the brake disk 22 to be disengaged from the hub section 23, thus freeing the armature 3 of the motor 2 for rotation. Moreover, the armature windings of the motor 2 are energized with resultant rotation of the propeller blades in increased pitch direction.

In response to movement of the switch 28 to decreased pitch position, the arm of the switch 28 engages the fixed contact member DP closing a circuit which includes the arm of the switch 28, fixed contact member DP conductor 29 and winding of the relay 30, brush 31, slip ring A, conductor 11, field coil 10, conductor 14, conductor 15, brush 16, commutator 17 and related armature windings, not shown, brush 18, conductor 19, twin electromagnets 20, conductor 21, slip ring C, brush 40, conductor 39, conductor 37, negative terminal of the battery 25, positive terminal of the battery 25, conductor 26 and the fixed contact member 27 on the arm of the switch 28.

In response to the closure of this circuit, the field coil 10 is energized and a magnetic field of suitable flux density and polarity is established with respect to the armature windings of the motor 2. Also, responsive to the closure of this circuit, the electromagnets 20 are energized, causing the brake disk 22 to be disengaged from the hub section 23, thus freeing the armature 3 of the motor 2 for rotation. Moreover, the armature windings of the motor 2 are energized with resultant motion of the propeller blades in decreased pitch direction.

Also, in response to the closure of the above named circuit, the winding of the relay 30 is energized, causing the armature thereof to engage the fixed contact member 35 and the fixed contact member 36. A circuit is accordingly closed which includes the fixed contact member 36, conductor 37 comprising the variable resistance 38, negative terminal of the battery 25, positive terminal of the battery 25, conductor 26, fixed contact member 27, arm of the switch 28, fixed contact member DP conductor 29 and winding of the relay 30, brush 31, slip ring A, conductor 11, field coil 10, conductor 14, field coil 12, conductor 13, slip ring B, brush 33, conductor 32, conductor 34, fixed contact member 35 and armature of the relay 30.

Responsive to the closure of this parallel circuit by the relay 30, increased current flows through the field coil 10 with resultant increase in the flux density of the magnetic field established thereby. This, in a proportionate manner, compensates for any tendency of the speed of rotation of the motor armature to increase. Further, responsive to the closure of said parallel circuit, the field coil 12 coacts with the motor armature to supplement the described action of the field coil 10 in compensating for any tendency of the speed of armature rotation to increase.

In connection with this supplemental action of the field coil 12, it will be observed that current passing therethrough in a direction from top to bottom, as shown on the drawing, is adapted to establish a magnetic field of opposite polarity with respect to the magnetic field established by the reversely wound field coil 10. However, it will be observed that the current flowing through said field coil 12 in response to closure of the last noted circuit traverses said field coil 12 in a direction from bottom to top, as shown on the drawing, reversing the normal polarity of said field coil 12 and causing the magnetic field established thereby to be of the same polarity as and supplement the magnetic field established by the field coil 10.

Accordingly, closure of said parallel circuit increases the normal magnetic effect of the coil 10 on the armature and establishes a reverse magnetic effect of the coil 12 on said armature. This, in accordance with the invention, substantially prevents over-speeding of the armature in reverse pitch operation, this speed-governing action being controllable by adjustment of the variable resistor 38.

Controlling the speed of armature rotation in the manner described with resultant control of the speed of rotation of the blade offsets or overcomes a well known tendency of airplane propeller blades to rotate faster when moving in decreased pitch direction than when moving in increased pitch direction.

It will be noted that the field coil 10 and the field coil 12 are both energized during decreased pitch operation of the motor 2, an auxiliary circuit being utilized to excite and reverse the polarity of said field coil 12. It is a feature of my invention that the relay 30 disconnects this auxiliary circuit during increased pitch operation of the motor 2, thereby permitting normal operation of the field coil 12.

While the invention has been described with respect to a certain preferred particular example which gives satisfactory results, it will be understood by those skilled in the art after understanding the invention, that various changes and modifications may be made without departing from the spirit and scope of the invention and it is intended, therefore, in the appended claims to cover all such changes and modifications.

What is claimed as new and desired to be secured by Letters Patent, is:

1. In combination, a reversible motor adapted to change the pitch of a propeller blade, field coils adapted to establish magnetic fields of similar flux density and opposite polarity, respectively, with respect to the armature winding of said motor when excited by currents of equal magnitude, electromagnetic means for preventing said motor from over-speeding in decreased pitch operation, said means being operative in response to energizing of said decrease pitch field coil, and means for suspending the operation of said first named means and operating said motor at desired speed in increased pitch direction.

2. In combination, a reversible motor adapted to change the pitch of a propeller blade, field coils adapted to establish magnetic fields of similar flux density and opposite polarity, respectively, with respect to the armature winding of said motor when excited by currents of equal magnitude, means for exciting one of said field coils and causing a field of higher than normal flux density to be established thereby, means for simultaneously energizing another of said field coils and reversing the polarity of the magnetic field established thereby to further increase said flux density, and means for simultaneously de-energizing said first named field coil and again reversing the polarity of said second named field coil.

3. In combination, a reversible motor adapted to change the pitch of a propeller blade, field coils adapted to establish magnetic fields of similar flux density and opposite polarity, respectively, with respect to the armature winding of said motor when excited by currents of equal magnitude, means including a relay for exciting one of said field coils, relay-actuating means for jointly increasing the excitation supplied to said field coil, energizing another of said field coils and reversing the polarity of said last named field coil whereby to provide an increased field strength, and means for jointly de-energizing said relay and energizing said last named field coil for normal operation thereof.

4. A mechanism for changing the pitch of a blade of a variable-pitch propeller including an electric motor, said motor having an armature winding and at least two field coils, means for exciting one of said field coils to cause said motor to run in a direction to increase the pitch of said blade, means for exciting a second of said field coils to cause said motor to run in a direction to decrease the pitch of said blade, said field coils being adapted to establish magnetic fields of substantially similar flux density and opposite polarity with respect to said armature winding when excited by currents of equal magnitude, means for preventing the motor from overspeeding, and thereby changing the pitch of said blade at an excessive rate, when the motor is running in a decrease pitch direction, and means for rendering said last mentioned means inoperative when said first mentioned coil is excited to cause the motor to run in an increase pitch direction.

5. A mechanism for changing the pitch of a blade of a variable-pitch propeller including an electric motor, said motor having at least two field coils, means for exciting one of said field coils to cause said motor to run in a direction to increase the pitch of said blade, means for exciting a second of said field coils to cause said motor to run in a direction to decrease the pitch of said blade, means including means for reversely exciting said first mentioned coil simultaneously with the excitation of said second coil for preventing the motor from over-speeding, and thereby changing the pitch of said blade at an excessive rate, when the motor is running in a decrease pitch direction, and means for rendering said last mentioned means inoperative when said first mentioned coil is excited to cause the motor to run in an increase pitch direction.

6. A mechanism for changing the pitch of a blade of a variable-pitch propeller including an electric motor, said motor having at least two field coils, means for exciting one of said field coils to cause said motor to run in a direction to increase the pitch of said blade, means for simultaneously exciting both of said field coils to cause said motor to run in a direction to decrease the pitch of said blade, the polarity of the magnetic field set up by said first mentioned coil when excited by said last mentioned means being reversed with respect to its polarity when excited by said first mentioned means, whereby to increase the field and to prevent said motor from over-speeding, and consequent changing of the pitch of said blade at an excessive rate, when the motor is running a decrease pitch direction, and means for rendering said second mentioned means inoperative when said first mentioned coil is excited to cause the motor to run in an increase pitch direction.

MEADE J. MAYNARD.

REFERENCES CITED

The following references are of record in the file of this patent:

UNITED STATES PATENTS

| Number | Name | Date |
| --- | --- | --- |
| 1,260,889 | Fleischmann | Mar. 26, 1918 |
| 1,540,655 | Scott et al. | June 2, 1925 |
| 1,724,404 | James | Aug. 13, 1929 |
| 2,293,912 | Mullen | Aug. 25, 1942 |